United States Patent
Kwon

(10) Patent No.: US 9,307,557 B2
(45) Date of Patent: *Apr. 5, 2016

(54) METHOD AND APPARATUS FOR TRANSMITTING DATA FRAME USING CHANNEL BONDING IN WIRELESS LAN

(71) Applicant: SAMSUNG ELECTRONICS CO., LTD., Suwon-si (KR)

(72) Inventor: Chang-Yeul Kwon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

This patent is subject to a terminal disclaimer.

(21) Appl. No.: 14/097,131

(22) Filed: Dec. 4, 2013

(65) Prior Publication Data

US 2014/0086228 A1 Mar. 27, 2014

Related U.S. Application Data

(63) Continuation of application No. 13/207,148, filed on Aug. 10, 2011, now Pat. No. 8,611,322, which is a continuation of application No. 11/604,774, filed on Nov. 28, 2006, now Pat. No. 8,023,481.

(60) Provisional application No. 60/758,223, filed on Jan. 12, 2006.

(30) Foreign Application Priority Data

Apr. 10, 2006 (KR) ......................... 10-2006-0032409

(51) Int. Cl.
*H04W 74/08* (2009.01)
*H04L 12/801* (2013.01)
(Continued)

(52) U.S. Cl.
CPC ....... *H04W 74/0816* (2013.01); *H04L 12/2865* (2013.01); *H04L 47/10* (2013.01);
(Continued)

(58) Field of Classification Search
CPC ............ H04W 74/0816; H04W 84/02; H04W 74/0808; H04W 74/002; H04W 74/08; H04W 88/10; H04W 48/12; H04L 12/2865; H04L 47/10; H04L 47/22; H04L 47/14

USPC ....................................... 455/450–452.2, 509
See application file for complete search history.

(56) References Cited

U.S. PATENT DOCUMENTS 6,977,944 B2 12/2005 Brockmann et al.
7,054,296 B1 5/2006 Sorrells et al.
(Continued)

FOREIGN PATENT DOCUMENTS

| JP | 2004514382 A | 5/2004 |
|---|---|---|
| JP | 2005-341557 A | 12/2005 |

(Continued)

OTHER PUBLICATIONS

"Part 11: Wireless LAN Medium Access Control (MAC) and Physical Layer (PHY) Specifications", Information Technology—Telecommunications exchange between systems—Local and metropolitan area networks—specific requirement, ANSI/IEEE Std. 802.11, 1999 Edition, 528 pages total.

(Continued)

*Primary Examiner* — Sharad Rampuria
(74) *Attorney, Agent, or Firm* — Sughrue Mion, PLLC

(57) ABSTRACT

A method and apparatus are provided for transmitting a data frame using channel bonding in a wireless local area network in which high throughput (HT) stations and legacy systems coexist. The method includes adding a legacy format physical layer header including information, which indicates that a medium is being used while a frame exchange sequence is performed with respect to the HT format data frame, to the HT format data frame, transmitting the HT format data frame with the physical layer header by using channel bonding, and broadcasting the legacy format CF-End frame through a plurality of channels used in the channel bonding. Accordingly, after a frame exchange sequence is completed, the legacy stations which use channels used in the channel bonding can participate in a fair contention for medium access.

9 Claims, 7 Drawing Sheets

(51) Int. Cl.
*H04L 12/815* (2013.01)
*H04W 74/00* (2009.01)
*H04L 12/28* (2006.01)
*H04W 84/02* (2009.01)
*H04W 48/12* (2009.01)
*H04W 88/10* (2009.01)

(52) U.S. Cl.
CPC ............... *H04L 47/14* (2013.01); *H04L 47/22* (2013.01); *H04W 74/002* (2013.01); *H04W 74/08* (2013.01); *H04W 74/0808* (2013.01); *H04W 84/02* (2013.01); *H04W 48/12* (2013.01); *H04W 88/10* (2013.01)

(56) References Cited

U.S. PATENT DOCUMENTS

| | | | |
|---|---|---|---|
| 7,561,510 B2 | 7/2009 | Imamura et al. | |
| 7,577,438 B2 | 8/2009 | Sammour et al. | |
| 7,639,658 B2 | 12/2009 | Frederiks et al. | |
| 7,680,150 B2 | 3/2010 | Liu et al. | |
| 7,768,971 B2 | 8/2010 | Trainin | |
| 7,818,018 B2 | 10/2010 | Nanda et al. | |
| 7,839,819 B2 | 11/2010 | Kim | |
| 7,881,275 B1 | 2/2011 | Bagchi | |
| 7,903,607 B2 | 3/2011 | Utsunomiya et al. | |
| 7,912,024 B2 | 3/2011 | Trachewsky | |
| 7,944,897 B2* | 5/2011 | Shao | H04W 74/0833 370/322 |
| 7,953,053 B2 | 5/2011 | Habetha | |
| 8,023,481 B2* | 9/2011 | Kwon | 370/338 |
| 8,072,980 B1 | 12/2011 | Zhang et al. | |
| 8,175,047 B2 | 5/2012 | Seok et al. | |
| 8,295,259 B1 | 10/2012 | Bagchi | |
| 8,359,530 B2 | 1/2013 | Sawai et al. | |
| 8,374,123 B2 | 2/2013 | Wentink | |
| 8,467,391 B1 | 6/2013 | Zhang et al. | |
| 8,611,322 B2* | 12/2013 | Kwon | 370/338 |
| 2004/0022219 A1 | 2/2004 | Mangold et al. | |
| 2005/0232275 A1 | 10/2005 | Stephens | |
| 2005/0243843 A1 | 11/2005 | Imamura et al. | |
| 2006/0280134 A1 | 12/2006 | Kwon et al. | |
| 2007/0110091 A1 | 5/2007 | Kwon | |
| 2008/0013496 A1 | 1/2008 | Dalmases et al. | |
| 2014/0133495 A1* | 5/2014 | Viger | H04W 74/0816 370/442 |

FOREIGN PATENT DOCUMENTS

| | | |
|---|---|---|
| KR | 100586891 B1 | 5/2006 |
| WO | 02/071650 A1 | 9/2002 |
| WO | 2005039105 A1 | 4/2005 |
| WO | 2005122501 A1 | 12/2005 |

OTHER PUBLICATIONS

Communication issued on Nov. 8, 2011 by the Japanese Patent Office in the counterpart Japanese Patent Application No. 2008-550222.

Communication issued on Oct. 12, 2007 by the Korean Intellectual Property Office in the counterpart Korean Patent Application No. 10-2006-0032409.

European Search Report, dated Sep. 21, 2012, issued by the European Patent Office in counterpart European Application No. 07708446.5.

Examination Report, dated Sep. 28, 2012, issued by the European Patent Office in counterpart European Application No. 07708446.5.

Seongkwan, Kim et al.: "A High-Throughput MAC Strategy for Next_generation WLANs", World of Wireless Mobile and Multimedia Networks, 2005. WOWMOM 2005. Sixth IEEE International Symposium on a Taormina-Giardini Naxos, Italy Jun. 13-16, 2005, Piscataway, NJ, USA, IEEE, Los Alamitos, CA, USA, Jun. 13, 2005, pp. 278-285, XP010811091, DOI:10.1109/WOWMOM.2005.6 ISBN:978-0-7695-2342-2.

Sunghyun, Choi et al.: "802.11g CP:a solution for IEEE 802.11g and 802.11b inter-working", VTC 2003—Spring. The 57th. IEEE Semi-annual Vehicular Technology Conference. Proceedings. Jeju, Korea, Apr. 22-25, 2003; [IEEE Vehicular Technology Conference], New York, NY:IEEE, US, vol. 1, Apr. 22, 2003, pp. 690-694, XP010862203, DOI: 10.1109/VETECS.2003.1207631 ISBN: 978-0-7803-7757-8.

* cited by examiner

METHOD AND APPARATUS FOR TRANSMITTING DATA FRAME USING CHANNEL BONDING IN WIRELESS LAN

CROSS-REFERENCE TO RELATED PATENT APPLICATION

This a continuation of application Ser. No. 13/207,148, filed on Aug. 10, 2011, which is a continuation of application Ser. No. 11/604,774, filed Nov. 28, 2006, which claims priority from U.S. Provisional Patent Application No. 60/758,223, filed on Jan. 12, 2006 in the U.S. Patent and Trademark Office, and Korean Patent Application No. 10-2006-0032409, filed on Apr. 10, 2006 in the Korean Intellectual Property Office, the disclosures of which are incorporated herein in their entirety by reference.

BACKGROUND OF THE INVENTION

1. Field of the Invention

Methods and apparatuses consistent with the present invention relate to a wireless local area network (LAN), and more particularly, to carrier sensing multiple access with collision avoidance (CSMA/CA) in a wireless LAN in which high throughput (HT) stations and IEEE 802.11 legacy systems coexist.

2. Description of the Related Art

Medium access control (MAC) using a carrier sensing multiple access with collision avoidance (CSMA/CA) method is used in a wireless LAN.

In the CSMA/CA method, physical carrier sensing and virtual carrier sensing are used for carrier sensing. In physical carrier sensing, a physical layer (PHY) determines whether a received power equal to or greater than a specific value is detected, and informs a medium access control (MAC) layer of whether a medium is in a busy or idle state, thereby sensing a carrier. In virtual carrier sensing, if an MAC protocol data unit (MPDU) can be correctly extracted from a received PHY protocol data unit (PPDU), a header field of the MPDU, that is, a duration/identification (ID) field, is analyzed, and the medium is deemed to be in the busy state during a scheduled time for using the medium. Stations determine whether the medium is in the busy state by using the two carrier sensing methods, and do not access the medium if it is in the busy state.

Referring to FIG. 1A, an MAC header of a frame transmitted through a general IEEE 802.11 wireless LAN includes duration information indicating a time between when the frame is transmitted and when an acknowledgement (ACK) frame is received to confirm that the frame is received. After receiving the frame, the stations analyze the MAC header so that medium access is not tried for a certain duration of time, thereby avoiding collision. According to a feature of a wireless medium, all stations connected through the wireless LAN can physically receive all frames transmitted in a radio wave coverage area even if the frame is sent to a particular station.

As described above, in virtual carrier sensing, the CSMA/CA can be effectively used only when the MAC protocol data unit/PHY service data unit (MPDU/PSDU) are analyzed without errors. That is, virtual carrier sensing can only be carried out when an MAC header value of a data frame of a station waiting for medium access can be correctly read.

However, if a transmitting station sends data with a high data transfer rate (Tx Rate) and an error occurs due to an unstable channel condition, or a receiving station cannot cope with the high data transfer speed, virtual carrier sensing cannot be carried out because the received MPDU/PSDU cannot be analyzed. Therefore, the CSMA/CA method becomes ineffective. Accordingly, when a legacy station operating in accordance with the IEEE 802.11a, IEEE 802.11b, and/or IEEE 802.11g standards and a high throughput (HT) station having a higher capability than that of the legacy station (for example, an multi-input-multi-output (MIMO) station or a station using a channel bonding scheme) coexist in the wireless LAN, and when an HT format is sent, the legacy station cannot analyze the HT format frame, and thus virtual carrier sensing cannot be correctly carried out.

FIG. 1B illustrates a configuration of a data frame used in the IEEE 802.11a standard. Referring to FIG. 1B, duration information can be predicted by analyzing information regarding the RATE field value and LENGTH field value included in the signal field of the PHY header, thereby avoiding medium access collision.

At present, the IEEE 802.11n standard is in development. Referring to FIG. 2, in the IEEE 802.11n standard, if HT stations and legacy stations coexist in the wireless LAN, a legacy format PHY header (L-Preamble, L-SIG) is added into an HT format data frame so as to be recognized by the legacy stations. In addition, a time required after an L-SIG field begins and until an ACK frame is received is recorded in the L-SIG field.

In other words, since the legacy stations can recognize the RATE field and the LENGTH field included in the legacy format PHY header when the legacy stations receive an HT format frame, even if the legacy stations cannot analyze the HT format MAC header, the legacy stations can determine that the medium is being used during that duration of time, thereby avoiding collision. Hereinafter, the time specified by the RATE field and the LENGTH field in the legacy format L-SIG field added into the HT format data frame will be referred to as an L-SIG Tx Opportunity Protection Period (LTPP).

When the LTPP mechanism is used, medium access collision can be avoided, but stations have to contend unfairly to attain permission for medium access. This will be described in reference with FIG. 3.

Referring to FIG. 3, when the LTPP mechanism is used, even if a legacy station can read the PHY header, the legacy station cannot read the next fields, that is, HT format, which leads to an error. Then, the PHY, or baseband layer, indicates the error occurrence to the MAC layer.

The error indication begins when the LTPP ends. From this point, the legacy station participates in contention for medium access after waiting for a longer time than the HT station. This is because, when an error occurs because the legacy station cannot read the HT format frame, the legacy station starts to back-off after standing by for a time defined in extended inter-frame space (EIFS, 94 us in IEEE 802.11a). This is different from the HT station which starts to back-off after standing by for a time corresponding to DCF inter-frame space (DIFS, 34 us in IEEE 802.11a). Accordingly, the legacy station becomes disadvantageous to other HT stations in terms of contending for medium access.

SUMMARY OF THE INVENTION

The present invention provides a method in which, even when an HT station transmits an HT format data frame through a wireless LAN in which legacy stations and HT stations coexist, the legacy stations can participate in a fair contention for medium access, and an apparatus therefor.

According to an aspect of the present invention, there is provided a method of transmitting an HT format data frame in a wireless LAN in which HT stations and legacy stations, which have different data transferring capabilities, coexist, the method comprising: adding a legacy format physical layer header including information, which indicates that a medium is being used while a frame exchange sequence is performed with respect to the HT format data frame, to the HT format data frame; transmitting the HT format data frame added with the legacy format physical layer header by using channel bonding; and broadcasting the legacy format control frames, which allow the stations to concurrently reset a waiting time for using the medium after recognizing the information, through each of channels used in the channel bonding when a time period elapses after the transmission is completed.

In the aforementioned aspect of the present invention, the control frame may be a contention free (CF)-End frame, and the information may be a RATE field value and a LENGTH field value included in the physical layer header.

In addition, the time period may be a short inter-frame space (SIFS).

In addition, the HT format data frame may be transmitted at a bandwidth of 40 MHz by bonding two channels each having a bandwidth of 20 MHz.

According to another aspect of the present invention, there is provided a computer-readable medium having embodied thereon a computer program for executing the method above.

According to another aspect of the present invention, there is provided an apparatus for transmitting an HT format data frame in a wireless LAN in which HT stations and legacy stations, which have different data transferring capabilities, coexist, the apparatus comprising: a header inserting unit adding a legacy format physical layer header including information, which indicates that a medium is being used while a frame exchange sequence is performed with respect to the HT format data frame, into the HT format data frame; and a frame transmitting unit transmitting the HT format data frame with the legacy format physical layer header by using channel bonding, and broadcasting the legacy format control frames, which allow the stations to concurrently reset a waiting time for using the medium after recognizing the information, through each of channels used in the channel bonding when a time elapses after the transmission is completed.

In addition, the control frame may be a CF-End frame.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1A:
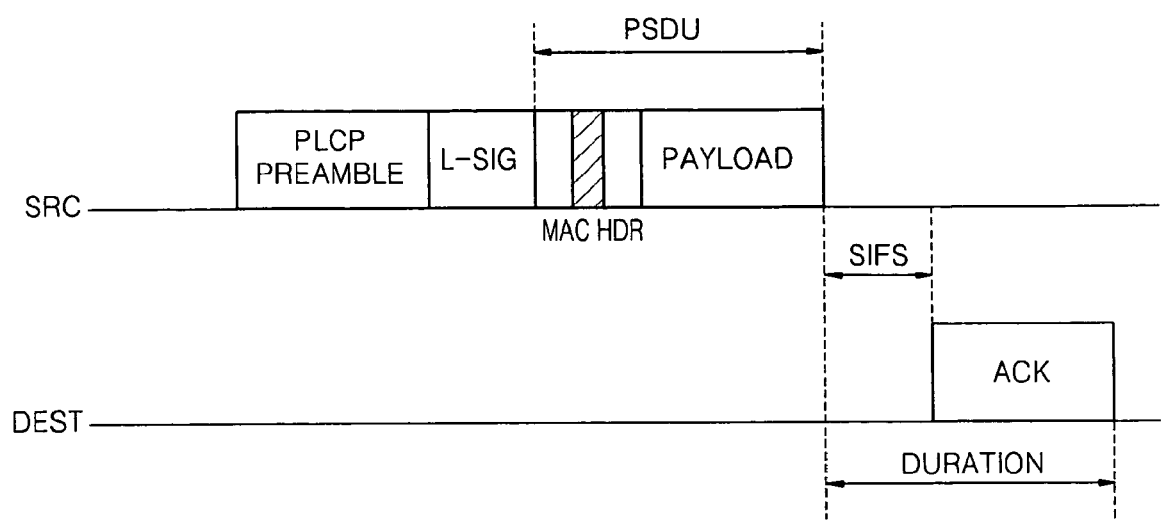
FIGS. 1A and 1B illustrate configurations of a data frame for preventing collision in a wireless LAN.
Figure 1B:
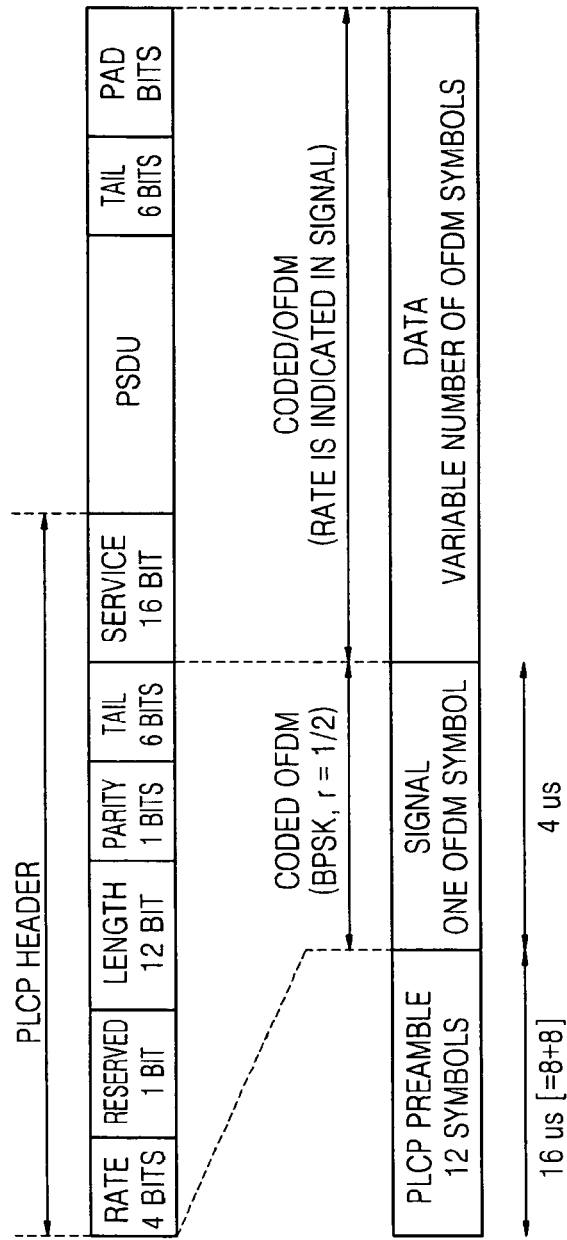
Figure 2:
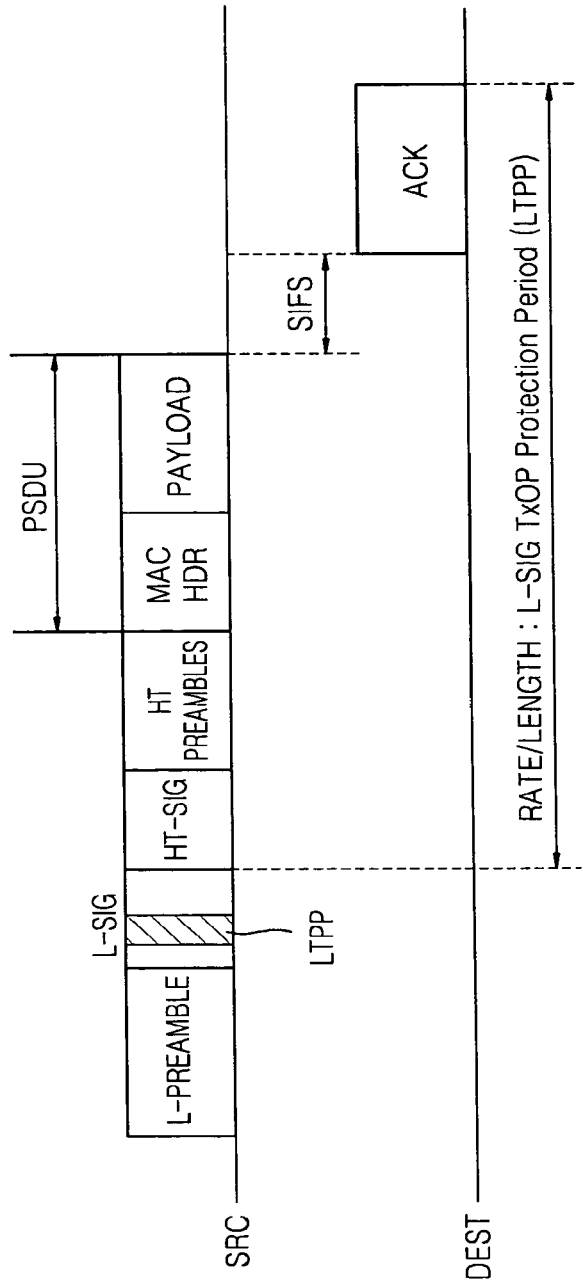
FIG. 2 illustrates a configuration of a data structure for preventing collision in a wireless LAN in which HT stations and legacy stations coexist.
Figure 3:
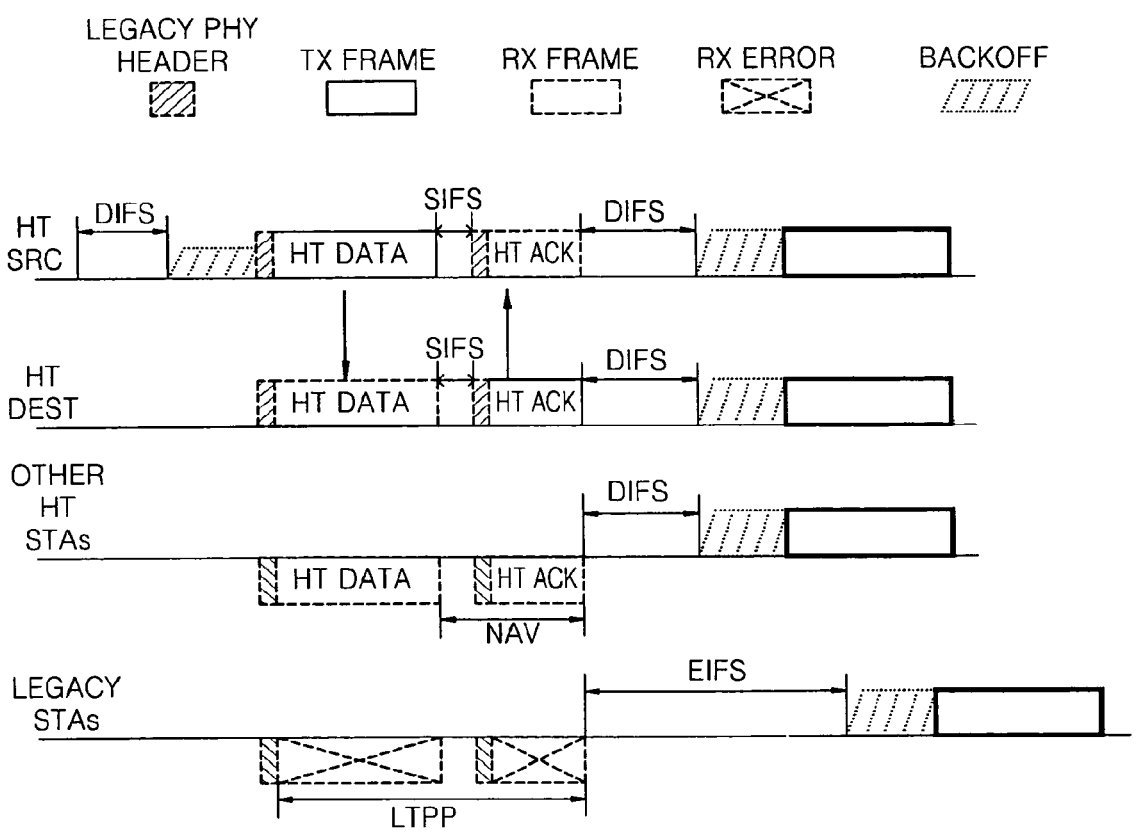
FIG. 3 illustrates an MAC method of stations using an LTPP mechanism.
Figure 4:
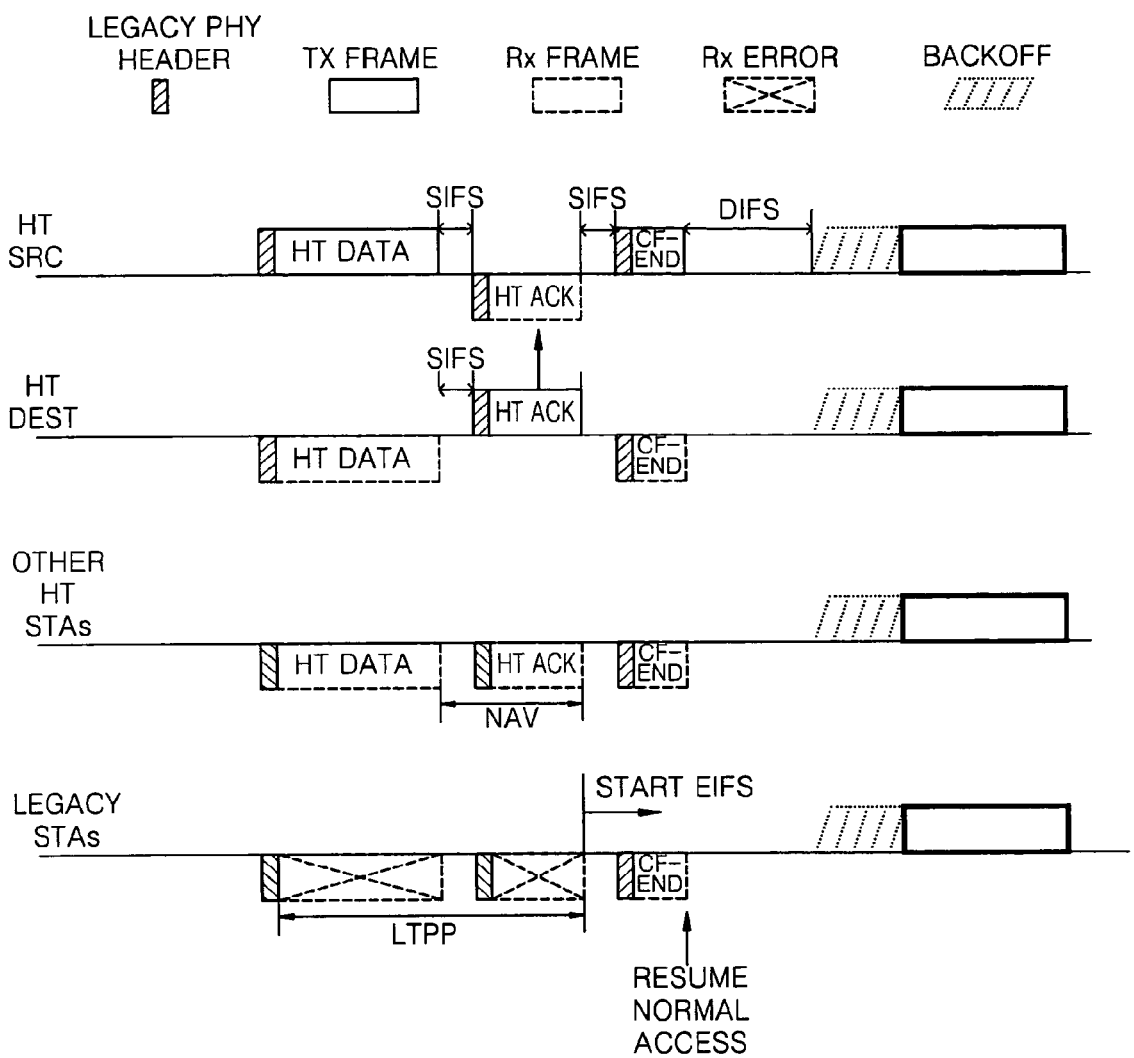
FIG. 4 illustrates a method for allowing stations to have a fair contention for medium access by using an LTPP mechanism according to an exemplary embodiment of the present invention.

FIG. 4 illustrates a method for allowing stations to have a fair contention for medium access by using an LTPP mechanism according to an exemplary embodiment of the present invention.

A transmission opportunity (TxOP) is a time required for transmitting a data frame. A CF-End frame is a message for canceling a remaining TxOP when a transmitting station that has obtained the TxOP by using a request-to-send/clear-to-send (RTS/CTS) frame exchange sequence has no frame to be sent even if the TxOP is still left. Stations which receive the CF-End recognize that a medium is available to be accessed. Referring to FIG. 4, the transmitting station broadcasts a legacy format CF-End frame when a short inter-frame space (SIFS) elapses after the transmitting station receives an ACK frame for an HT format data frame.

Since the CF-End frame is a message indicating availability of a medium, after receiving the CF-End frame, an HT station and a legacy station can participate in contention for medium access by resetting their network allocation vector (NAV) timers in the same manner.

Figure 5:
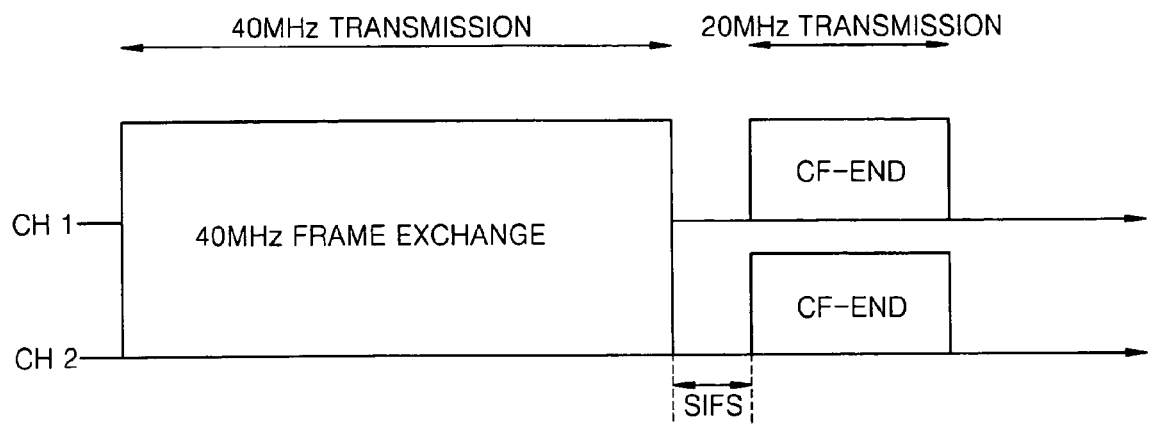
FIG. 5 illustrates a method for allowing stations to have a fair contention for medium access by using channel bonding according to an exemplary embodiment of the present invention.

When an HT station sends an HT format data frame by using a channel bonding scheme, the CF-End frame has to be broadcast through each channel. This is illustrated in FIG. 5.

In general, IEEE 802.11 legacy stations send and receive data through a channel having a bandwidth of 20M Hz. However, the HT station using the channel bonding scheme can send data through a channel having a bandwidth of 40 MHz by bonding two adjacent channels. Referring to FIG. 5, the HT station bonds a first channel and a second channel each having a bandwidth of 20 MHz, and thus sends a data frame through a bandwidth of 40 MHz. Thereafter, when an ACK frame is received, and thus a frame exchange sequence is completed, the HT station, or the transmitting station, has to broadcast the legacy format CF-End frame through each of the first and second channel used in the channel bonding. This is because a legacy station which communicates through the first channel and a legacy station which communicates through the second channel may coexist in the wireless LAN.

That is, if the transmitting station sends the CF-End frame by using the channel bonding, legacy stations using either one of the channels cannot analyze the CF-End frame, and if the transmitting station sends the CF-End frame to either one of the channels, a legacy station using the other channel cannot reset its NAV timer even when the medium is available.

Figure 6:
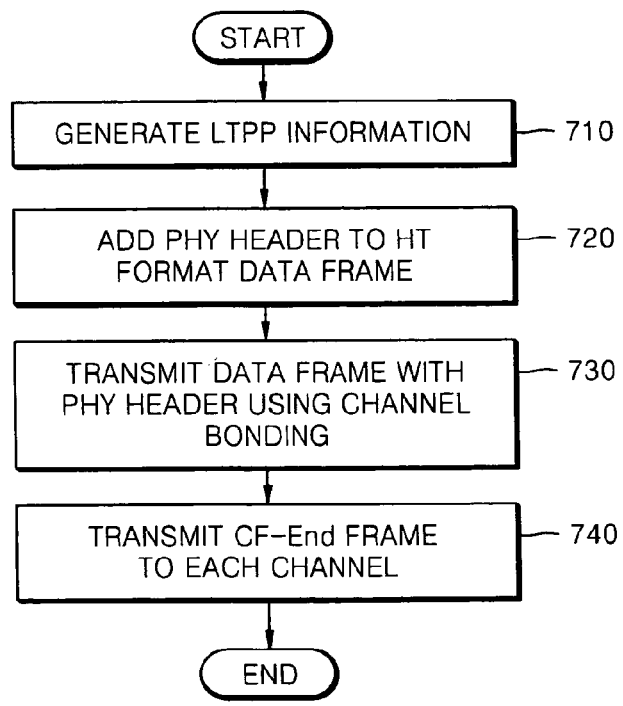
FIG. 6 is a flowchart illustrating a method of transmitting a data frame according to an exemplary embodiment of the present invention.

FIG. 6 is a flowchart illustrating a method of transmitting a data frame according to an exemplary embodiment of the present invention.

A transmitting station, or an HT station, generates LTPP information (that is, a RATE field value and a LENGTH field value) which indicates that a medium is being used while a frame exchange sequence is performed with respect to an HT format data frame (operation 710). Next, the generated LTPP information is recorded in a legacy format PHY header, and the PHY header including the LTPP information is added into an HT format data frame to be sent (operation 720).

The transmitting station transmits the HT format data frame with the legacy format PHY header through a plurality of channels by using channel bonding (operation 730). For example, two 20 MHz channels may be bonded so as to transmit the data frame through a 40 MHz channel.

If the data frame is transmitted, an ACK frame is received, and thus the frame exchange sequence is completed and then the transmitting station broadcasts the legacy format CF-End frame through each channel used in the channel bonding after a predetermined time elapses (operation 740). Preferably, but not necessarily, the CF-End frame is broadcast when the SIFS elapses after the frame exchange sequence is completed.

Figure 7:
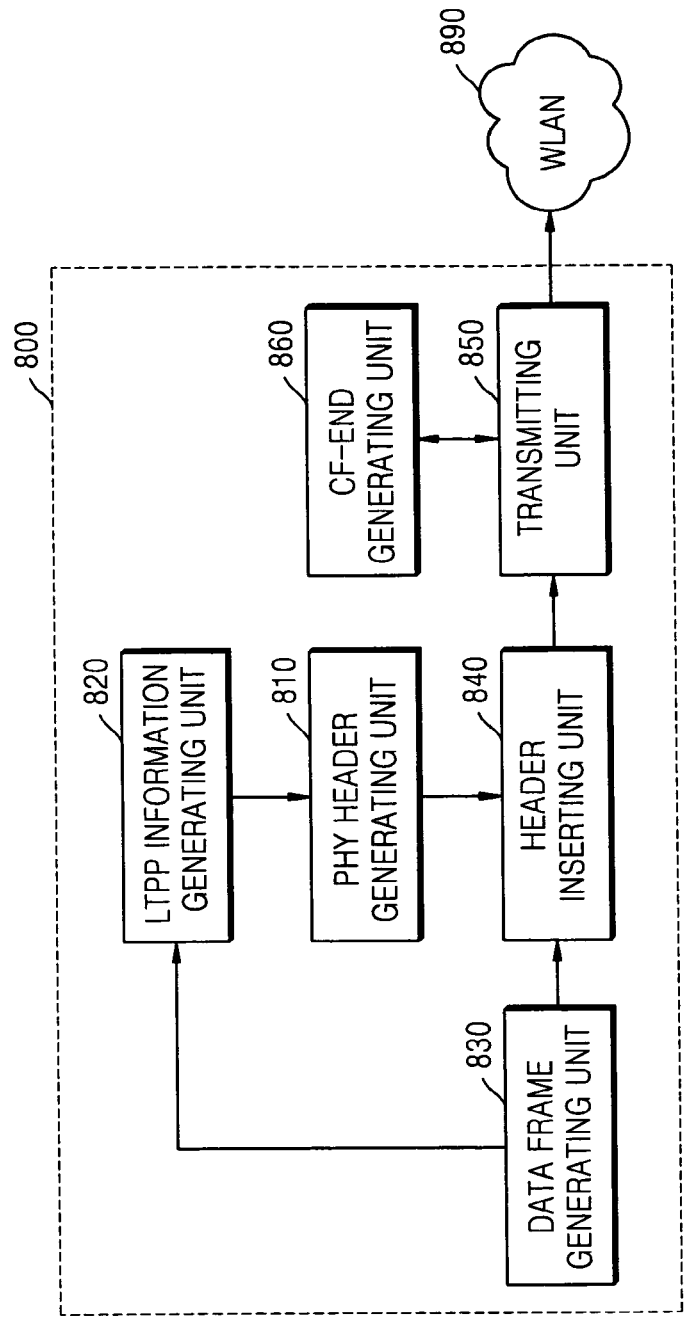
FIG. 7 is a block diagram of an apparatus for transmitting a data frame according to an exemplary embodiment of the present invention.

FIG. 7 is a block diagram of an HT station which transmits a data frame having an HT format according to an exemplary embodiment of the present invention.

Referring to FIG. 7, an HT station 800 includes an LTPP information generating unit 820, a data frame generating unit 830, a PHY header generating unit 810, a header inserting unit 840, a CF-End generating unit 860, and a transmitting unit 850.

The data frame generating unit 830 generates a data frame of an HT format, that is, an MAC protocol data unit (MPDU). The LTPP information generating unit 820 generates LTPP information, that is, a RATE field value and a LENGTH field value.

The PHY header generating unit 810 generates a PHY header of a legacy format including the LTPP information generated by the LTPP information generating unit 820. The header inserting unit 840 adds the PHY header generated by the header generating unit 810 to the data frame having the HT format generated by the data frame generating unit 830.

The transmitting unit 850 transmits the HT format data frame with the legacy format PHY header to a receiving station by using channel bonding.

The CF-End generating unit 860 generates a plurality of legacy format CF-End frames, the number of which is equal to the number of channels used in channel bonding performed by the transmitting unit 850. The transmitting unit 850 transmits the HT format data frame. Thereafter, if an ACK frame in response to the data frame is received and thus a frame exchange sequence is completed, the transmitting unit 850 broadcasts the CF-End frame generated by the CF-End generating unit 860 through each channel used in the channel bonding after the SIFS elapses.

Accordingly, in the exemplary embodiments of the present invention, even when an HT station transmits an HT format data frame by using channel bonding through a wireless LAN in which legacy stations and HT stations coexist, the legacy stations which use channels used in the channel bonding can participate in a fair contention for medium access.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a high throughput (HT) format data frame in a wireless local area network in which HT stations and legacy stations, coexist, the method comprising:
    adding a legacy format physical layer header to the HT format data frame, the legacy format physical layer header comprising a RATE field value and a LENGTH field value which determined a time period that legacy stations will not transmit data;
    transmitting the HT format data frame with the legacy format physical layer header using channel bonding; and
    separately broadcasting a control frame, which allows the HT and legacy stations to reset a waiting time for using a medium, through each of a plurality of channels used in the channel bonding,
    wherein, in the transmitting, the HT format data frame is transmitted at a first bandwidth by bonding two channels, each having a second bandwidth less than the first bandwidth.

2. The method of claim 1, wherein the control frame is a contention free (CF)-End frame.

3. The method of claim 1, wherein the separately broadcasting comprises broadcasting the control frame after a second time period elapses after the transmitting the HT format data frame with the physical layer header is completed, the second time period being a short inter-frame space (SIFS).

4. The method of claim 1, wherein the legacy station complies with one of the IEEE 802.11a standard, the IEEE 802.11b standard, and the IEEE 802.11g standard.

5. A non-transitory computer-readable medium having embodied thereon a computer program for executing a method of transmitting a high throughput (HT) format data frame in a wireless local area network (LAN) in which HT stations and legacy stations, coexist, the method comprising:
    adding a legacy format physical layer header to the HT format data frame, the legacy format physical layer header comprising a RATE field value and a LENGTH field value which determine a time period that legacy stations will not transmit data;
    transmitting the HT format data frame with the legacy format physical layer header using channel bonding; and
    separately broadcasting a control frame, which allows the HT and legacy stations to concurrently reset a waiting time for using a medium, through each of a plurality of channels used in the channel bonding,
    wherein, in the transmitting, the HT format data frame is transmitted at a first bandwidth by bonding two channels, each having a second bandwidth of less than the first bandwidth.

6. An apparatus for transmitting a high throughput (HT) format data frame in a wireless local area network in which HT stations and legacy stations, coexist, the apparatus comprising:
    a header inserting unit which adds a legacy format physical layer header to the HT format data frame, the legacy format physical layer header comprising a RATE field value and a LENGTH field value which determine a time period that legacy stations will not transmit data; and
    a frame transmitting unit which transmits the HT format data frame with the legacy format physical layer header using channel bonding, and broadcasts a control frame, which allow the stations to reset a waiting time for using a medium, separately through each of a plurality of channels used in the channel bonding, wherein, the frame transmitting unit sends the HT format data frame at a first bandwidth by bonding two channels, each having a second bandwidth less than the first bandwidth.

7. The apparatus of claim 6, wherein the control frame is a contention free (CF)-End frame.

8. The apparatus of claim 6, wherein the frame transmitting unit broadcasts the control frame after a second time period elapses after the transmitting the HT format data frame with the physical layer header is completed, the second time period being a short inter-frame space (SIFS).

9. The apparatus of claim 6, wherein the legacy station complies with one of the IEEE 802.11a standard, the IEEE 802.11b standard, and the IEEE 802.11g standard.

* * * * *